(12) United States Patent
Araki (10) Patent No.: US 8,797,154 B2
(45) Date of Patent: Aug. 5, 2014

(54) IN-VEHICLE DISPLAY APPARATUS (71) Applicant: Denso Corporation, Kariya (JP)

(72) Inventor: Teruaki Araki, Kariya (JP)

(73) Assignee: Denso Corporation, Kariya (JP)

( * ) Notice: Subject to any disclaimer, the term of this patent is extended or adjusted under 35 U.S.C. 154(b) by 51 days.

(21) Appl. No.: 13/659,248

(22) Filed: Oct. 24, 2012

(65) Prior Publication Data
US 2013/0135093 A1 May 30, 2013

(30) Foreign Application Priority Data

Nov. 30, 2011 (JP) ................................ 2011-262076

(51) Int. Cl.
*B60Q 1/00* (2006.01)
(52) U.S. Cl.
USPC ........ 340/459; 340/438; 340/691.1; 715/810; 345/5; 116/300
(58) Field of Classification Search
USPC ............... 340/459, 815.78, 815.73, 438, 441, 340/691.1; 715/810, 700; 362/23, 26, 27; 345/4, 5, 75.1, 76, 533; 116/288, 300
See application file for complete search history.

(56) References Cited

U.S. PATENT DOCUMENTS

| 6,373,472 | B1 * | 4/2002 | Palalau et al. ................. | 345/173 |
| 6,788,196 | B2 * | 9/2004 | Ueda .............................. | 340/459 |
| 7,340,333 | B2 * | 3/2008 | Lenneman et al. ............. | 701/36 |
| 7,683,771 | B1 * | 3/2010 | Loeb .............................. | 340/461 |
| 8,094,127 | B2 * | 1/2012 | Young ............................ | 345/173 |
| 8,155,837 | B2 * | 4/2012 | Aoki et al. ...................... | 701/41 |
| 8,598,999 | B2 * | 12/2013 | Tuzar et al. ................ | 340/425.5 |
| 2004/0172178 | A1 | 9/2004 | Takeda et al. | |

FOREIGN PATENT DOCUMENTS

| JP | 2002-205572 | 7/2002 |
| JP | 2003-252080 | 9/2003 |
| JP | 2004-256047 | 9/2004 |
| JP | 2007-322215 | 12/2007 |
| JP | 2009-168557 | 7/2009 |
| JP | 2011-046327 | 3/2011 |
| JP | 2011-100019 | 5/2011 |

OTHER PUBLICATIONS

Office action dated Oct. 3, 2013 in corresponding Japanese Application No. 2011-262076.

* cited by examiner

*Primary Examiner* — Toan N Pham
(74) *Attorney, Agent, or Firm* — Harness, Dickey & Pierce, PLC (57) ABSTRACT

An in-vehicle display apparatus includes: multiple switchable display elements for displaying one of display items in a display group that is assigned each switchable display element; an operation device for outputting an operation signal according to an operation of a user; a determination device for determining an operation mode of the operation of the user with respect to the operation device, according to the operation signal; and a display control device for independently controlling each switchable display element to execute a switching and displaying operation according to the operation mode. In the switching and displaying operation, the display control device controls one of switchable display elements to switch a current display item to another display item according to a predetermined switching order of display items every time the operation device outputs the operation signal.

11 Claims, 7 Drawing Sheets

IN-VEHICLE DISPLAY APPARATUS

CROSS REFERENCE TO RELATED APPLICATION

This application is based on Japanese Patent Application No. 2011-262076 filed on Nov. 30, 2011, the disclosure of which is incorporated herein by reference.

TECHNICAL FIELD

The present disclosure relates to an in-vehicle display apparatus for displaying at least one of multiple items having predetermined contents on a display element in such a manner that multiple items are switched from one to another.

BACKGROUND

Conventionally, a trip computer or a drive monitor as an in-vehicle display apparatus displays vehicle information including at least one of fuel consumption, a driving distance of residual fuel, an average speed, external temperature and the like in addition to a total travel distance (i.e., an integral travel distance or an odometer) and a sectional travel distance (i.e., a reset type distance meter or a trip odometer). The vehicle information includes preliminary determined items, so that the apparatus displays to switch from one item to another item. The in-vehicle display apparatus is defined as an in-vehicle meter apparatus, and disclosed in, for example, JP-A-2011-100019, JP-A-2009-168557, JP-A-2003-252080 and JP-A-2011-46327. The apparatus, in general, includes a display device and one operation device such as a push button. The display device switches to display each item such as the driving distance and the fuel consumption in a predetermined order every time an user operates the operation device.

Figure 7:
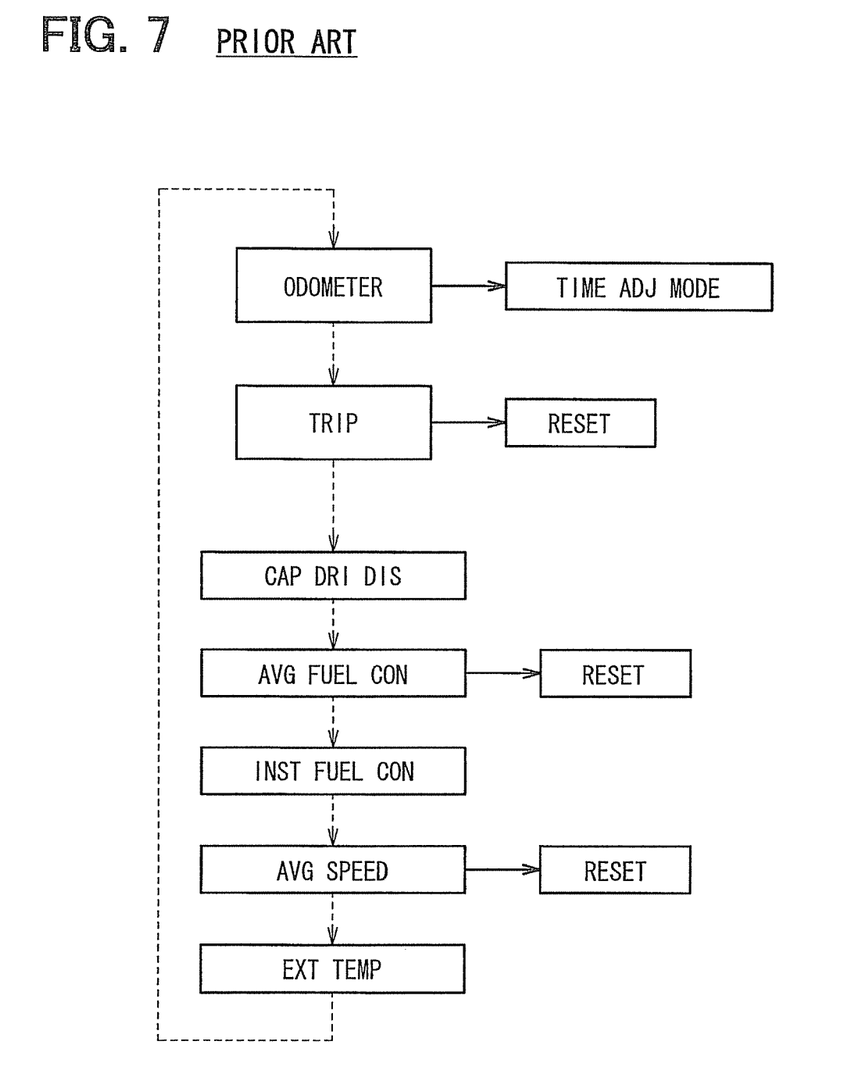
FIG. 7 is a flowchart showing an item to be switched and displayed in a conventional in-vehicle display apparatus.
Figure 8:
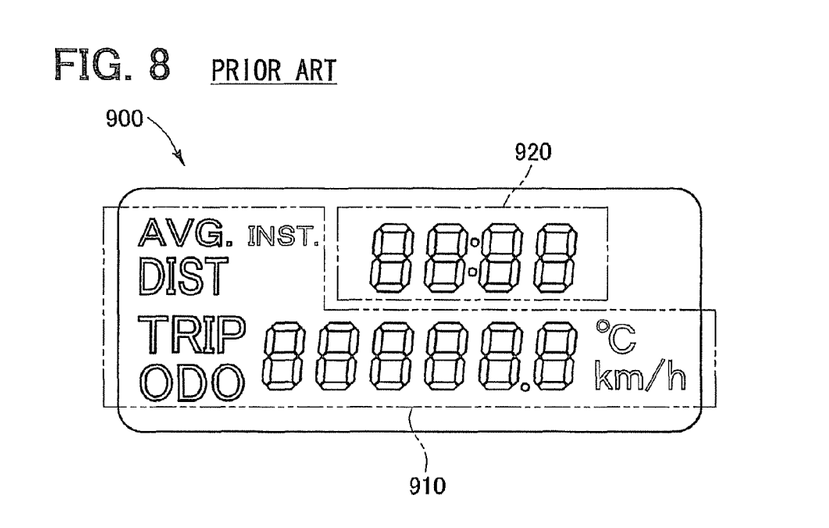
FIG. 8 is a diagram showing a display device in the conventional in-vehicle display apparatus.

Here, FIG. 7 shows a flowchart of a switching display mode of items in a conventional in-vehicle display apparatus. In FIG. 7, a dotted arrow represents an operation of the user who pushes, the operation device for a short time. A solid arrow represents an operation of the user who pushes the operation device for a long time. FIG. 8 shows a display device 900 in the conventional in-vehicle display apparatus. The display device 900 includes: a switching display element 910 for switching and displaying at least one item among multiple items having various contents such as the driving distance and the fuel consumption; and a time display element 920 for displaying time. As shown in FIG. 7, when the user pushes the operation device for a short time, the content to be displayed on the switching display element 910 is switched in the predetermined order such as an order from the total driving distance, the sectional driving distance, the driving distance of residual fuel, the average fuel consumption, the instantaneous fuel consumption, the average speed, to the external temperature. When the switching display element 910 displays the total driving distance, and the user pushes the operation device for a long time, the display device 920 switches to a time adjustment mode, in which the present time of the time display element 920 is adjusted. When the switching display element 910 displays the sectional driving distance, the average fuel consumption or the average speed, and the user pushes the operation device for a long time, the displayed sectional driving distance, the average fuel consumption or the average speed is reset to be zero.

Thus, in the conventional art, the switching operation of the content of the item to be displayed on the switching display element, the time adjustment operation and the reset operation are executed according to one operation of the operation device such as a short time pushing operation and a long time pushing operation. In view of recent requirements of the user, the number of items to be switched and displayed on the switching display element increases according to usage setup. Accordingly, in a conventional art such that the switching display operation is executed by one operation of the operation device, it is necessary to push the operation device multiple times until a required item is displayed on the display element. Thus, a requirement of the HMI (human machine interface) for the user who operates the operation device while the user drives the vehicle is not satisfied.

Figure 9:
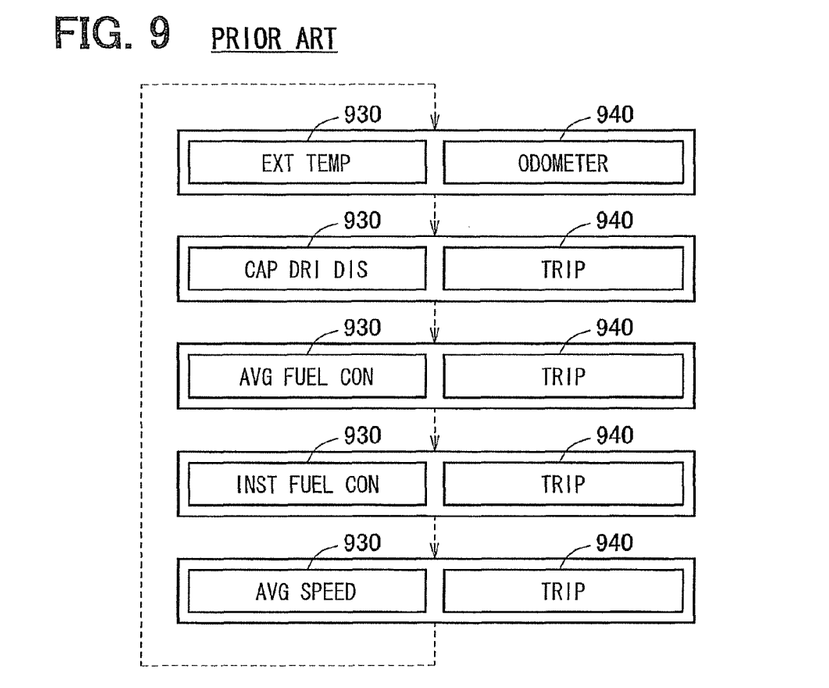
FIG. 9 is a flowchart showing two items to be displayed on two switching display elements, respectively, and to be switched in a certain order.

Further, as shown in FIG. 9, it is required for the apparatus to have multiple switching display elements so that multiple contents of items are displayed at the same time. In FIG. 9, the apparatus includes two switching display elements 930, 940. Here, a dotted arrow represents an operation of the user who pushes the operation device for a short time. In FIG. 9, a first switching display element 930 switches and displays one of the external temperature, the driving distance of residual fuel, the average fuel consumption, the instantaneous fuel consumption, and the average speed in this order. A second switching display element 940 switches and displays the total driving distance and the sectional driving distance alternately. Here, when the switching display operation in FIG. 9 is performed by one operation of the operation device, a combination of items to be displayed on the first and second switching display elements 930, 940 at the same time may be limited. Specifically, in FIG. 9, for example, when the second switching display element 940 displays the total driving distance, the first switching display element 930 always displays the external temperature. When the second switching display element 940 displays the sectional driving distance, the first switching display element 930 displays a content other than the external temperature. Specifically, in FIG. 9, both of the external temperature and the sectional driving distance are not displayed at the same time. Thus, the user needs are not satisfied sufficiently.

Thus, the apparatus may include multiple switching display elements, and each switching display element includes a respective operation device. In this case, the number of contents to be displayed and switched on each switching display element is reduced, compared with a case where the apparatus includes only one switching display element. Thus, the number of operation times for displaying the required item of the user is reduced, and a combination of items to be displayed on each switching display element is not limited excessively. However, in this case, it is necessary for the user to determine which operation device the user should operate when the user wants to display one of items as the required item. When the user drives the vehicle, it is difficult for the user to select one of the operation devices immediately. Further, it may be necessary for the user to see the apparatus for a comparatively long time. Furthermore, since the apparatus includes multiple operation devices, the number of elements for providing the apparatus increases, so that a manufacturing cost of the apparatus is made high.

SUMMARY

It is an object of the present disclosure to provide an in-vehicle display apparatus for switching and displaying one of multiple items. A manufacturing cost of the apparatus is improved, and contents of items, which are required by a user, are displayed at the same time. Further, the apparatus switches effectively and immediately from one item to another item, which is required by the user.

According to an aspect of the present disclosure, an in-vehicle display apparatus includes: a plurality of switchable display elements, each of which displays one of display items in a corresponding display group that is assigned to the switchable display element, wherein each display group includes a plurality of predetermined display items; an operation device for outputting an operation signal according to an operation of a user; a determination device for determining an operation mode of the operation of the user with respect to the operation device, according to the operation signal; and a display control device for independently controlling each switchable display element to execute a switching and displaying operation according to the operation mode of the operation device. In the switching and displaying operation, the display control device controls one of switchable display elements to switch a current display item to another display item and to display the another display item according to a predetermined switching order of display items every time the operation device outputs the operation signal.

In the above apparatus, since the apparatus includes multiple switchable display elements for switching a display item displayed on the switchable display element, multiple display items are displayed at the same time. Further, the number of display items to be displayed on each switchable display element is reduced, compared with a case where the apparatus includes only one switchable display element. Thus, the apparatus can switch and display required display item effectively and quickly. Further, since the apparatus includes only one operation device for switching the display items of the switchable display elements, a manufacturing cost of the apparatus is reduced. Furthermore, the determination device determines the operation mode of the user with respect to the operation device, and the display control device controls independently and individually the switchable display elements according to the operation mode. Thus, the switchable display elements can display required display items at the same time. Thus, the apparatus displays multiple display items at the same time when the user operates only one operation device. Therefore, the apparatus can easily display the required display items, which is required by the user, by merely selecting the operation mode of the operation device.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
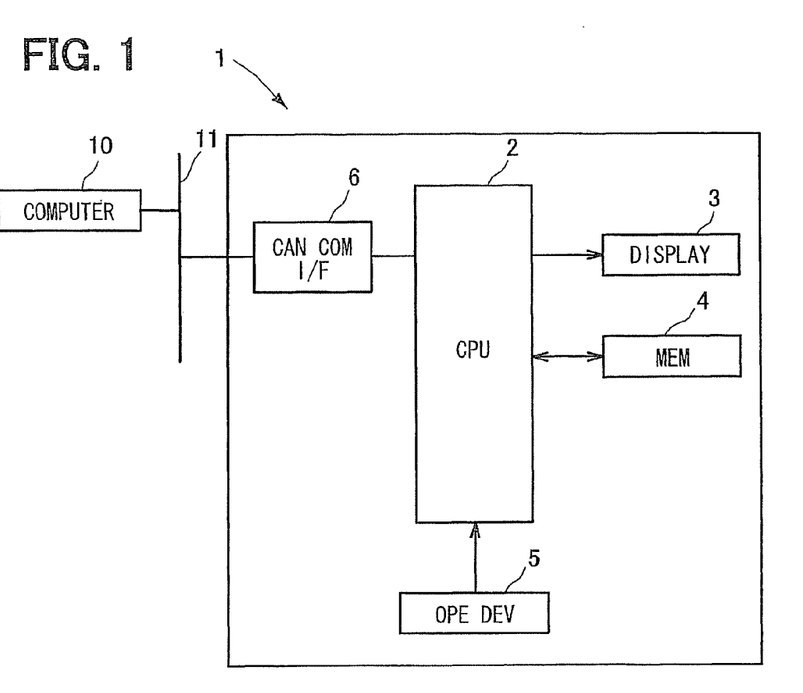
FIG. 1 is a block diagram showing a meter apparatus according to an example embodiment.

An in-vehicle display apparatus according to an example embodiment of the present disclosure will be explained. In the present embodiment, the apparatus is an in-vehicle meter apparatus. FIG. 1 shows a block diagram of the meter apparatus 1. The meter apparatus 1 is a combination meter for simultaneously displaying various vehicle information such as meter information of a speed meter, a tachometer, a fuel meter and the like, a total driving distance (information of an odometer), fuel consumption and the like. The meter apparatus 1 includes a display 3, a memory 4, an operation device 5, a CAN communication I/F 6 and a CPU 2, which is coupled with the display 3, the memory 4, the operation device 5 and the CAN communication I/F 6. The display 3 provides a part of a display region of the combination meter. The display 3 displays various vehicle information such as the total driving distance (i.e., the odometer) and the fuel consumption. The display 3 is made of a liquid crystal display (LCD). The display 3 is arranged on an instrument panel, which faces a driver seat.

Figure 2:
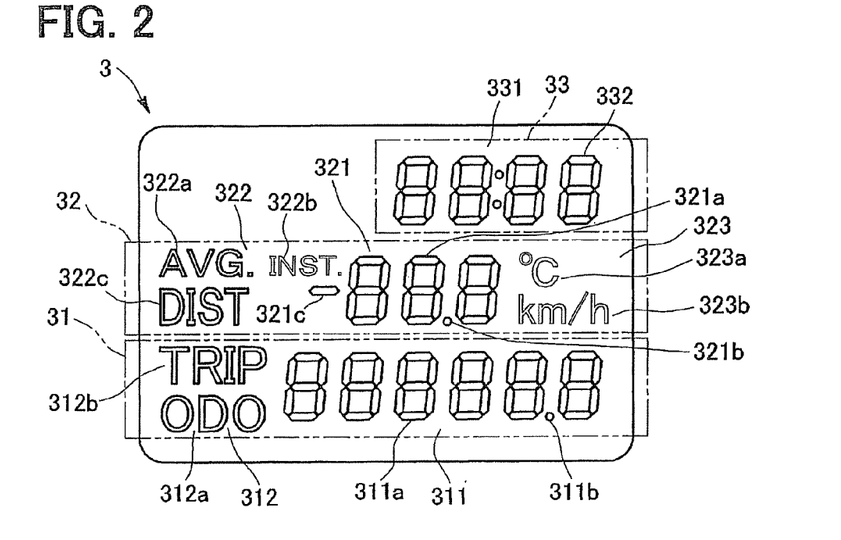
FIG. 2 is a diagram showing a front view of a display device.

FIG. 2 shows a front view of the display 3. As shown in FIG. 2, the display 3 includes three display elements 31-33, which are arranged along a vertical direction. In the present embodiment, the display 3 is a segment type display. Alternatively, the display 3 may be a dot matrix type display. A first switching display element 31 arranged on a lowest side of the display 3 switches and displays one of items in a first group, which includes a total driving distance and a sectional driving, distance. The total driving distance is defined in an odometer, which represents a total driving distance from a manufacturing time to the present time. The sectional driving distance is defined in a reset type distance meter or a trip odometer, which represents a driving distance in a certain period. The certain period is defined from a previous reset time to the present time. The sectional driving distance can be reset. The first switching display element 31 includes a numerical display region 311 and an indication type display region 312. The total driving distance or the sectional driving distance is displayed in the numerical display region 311. The indication type display region 312 is arranged on a left side of the numerical display region 311, and displays the indication type of the numerical display region 311 so that the indication type display region 312 represents "trip odometer" as the sectional driving distance or "odometer" as the total driving distance. The numerical display region 311 includes six numerical regions 311a, each of which represents a figure between zero and nine. The six numerical regions 311a are arranged along a right-left direction. When the first switching display element 31 displays the total driving distance, the total driving distance can be shown in six digits. The numerical display region 311 further includes a point display region 311b, which represents a period, i.e., ".". The point display region 311b is disposed between the last digit numerical region 311a and the second last digit numerical region 311a. When the first switching display element 31 displays the sectional driving distance, the point display region 311b turns on, so that the first switching display element 31 represents the sectional driving distance to one decimal place. For example, the sectional driving distance is shown as "12.3".

The indication type display region 312 includes a first indication type display region 312a for displaying the mark "ODO" corresponding to the total driving distance and a second indication type display region 312b for displaying the mark "TRIP" corresponding to the sectional driving distance. For example, when the first switching display element 31 displays the total driving distance, the first indication type display region 312a turns on so that the mark "ODO" is shown. In this case, the second indication type display region 312b turns off so that the mark "TRIP" is not shown.

The second switching display element 32 is arranged in the middle of the display 3, and switches and displays the vehicle information about the fuel consumption mainly. Specifically, the second switching display element 32 switches and displays one of items in a second group, which includes a driving distance of residual fuel, average fuel consumption, instantaneous fuel, consumption, an average vehicle speed, and external temperature. The driving distance of residual fuel shows a capable driving distance of the vehicle until fuel of the vehicle is empty. The average fuel consumption represents fuel consumption in a certain period from previous reset time to the present time. The instantaneous fuel consumption represents fuel consumption at the present time. The average vehicle speed represents vehicle speed in a certain period from previous reset time to the present time. The external temperature represents temperature of the outside of the vehicle. Here, the average fuel consumption and the average vehicle speed in the second group can be reset.

The second switching display element 32 includes a numerical display region 321, an indication type display region 322 and a unit display region 323. The numerical display region 321 shows the numerical information of the vehicle in the second group. The indication type display region 322 is arranged on the left side of the numerical display region 321, and displays the indication type of the numerical display region 321. The unit display region 323 is arranged on the right side of the numerical display region 321, and displays a unit of the numerical information in the numerical display region 321. The numerical display region 321 includes three numerical regions 321a, each of which represents a figure between zero and nine. The three numerical regions 321a are arranged along a right-left direction so that the numerical display region 321 can show three-digit number. The numerical display region 321 further includes a point display region 321b, which represents a period, i.e., ".". The point display region 321b is disposed between the last digit numerical region 321a and the second last digit numerical region 321a. When the point display region 321b turns on, the second switching display element 32 represents the number to one decimal place. For example, the number is shown as "23.4". The numerical display region 321 further includes a minus display region 321c, which is disposed on the left side of the top digit numerical region 321a. The minus display region 321c shows a minus mark, i.e., "–." When the second switching display element 32 shows the external temperature, and the external temperature is below zero, the minus display region 321c turns on so that the second switching display element 32 displays minus external temperature. For example, the external temperature is shown as "–23.4° C."

The indication type display region 322 includes: a first indication type display region 322a for showing that the indication type of the numeric information in the numerical display region 321 is an average value; a second indication type display region 322b for showing that the indication type of the numeric information in the numerical display region 321 is an instantaneous value; and a third indication type display region 322c for showing that the indication type of the numeric information in the numerical display region 321 is a distance. Specifically, the first indication type display region 322a represents a mark "AVG," the second indication type display region 322b represents a mark "INST," and the third indication type display region 322c represents a mark "DIST." The unit display region 323 includes a first unit display region 323a for showing the unit of temperature and a second unit display region 323b for showing the unit of a distance, fuel consumption, or a vehicle speed. Specifically, the first unit display region 323a represents a mark "° C.," and the second unit display region 323b represents a mark "km," a mark "km/l," or a mark "km/h." Here, the second unit display region 323b includes multiple segments, which provide the mark "km/h." When a certain combination of segments turns on, the second unit display region 323b shows the mark "km," the mark "km/l," or the mark "km/h."

Figure 3A:
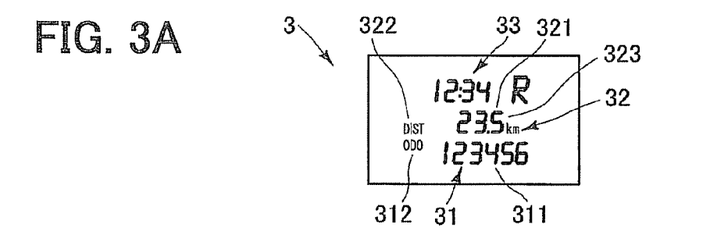
FIGS. 3A to 3E are diagrams showing various display examples on the display device.
Figure 3B:
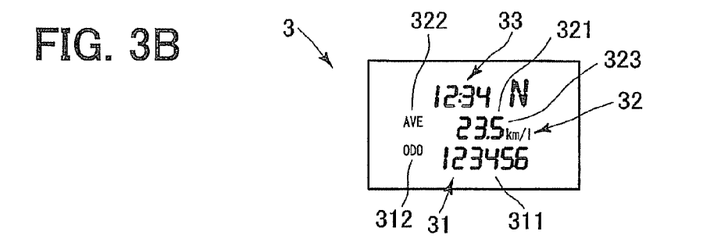
Figure 3C:
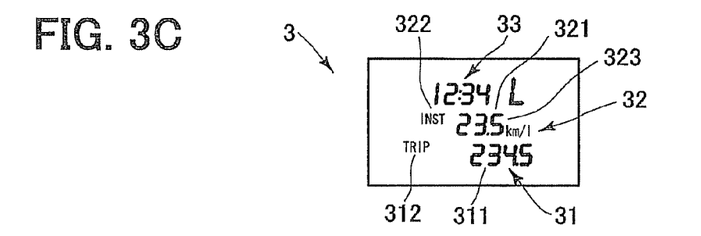
Figure 3D:
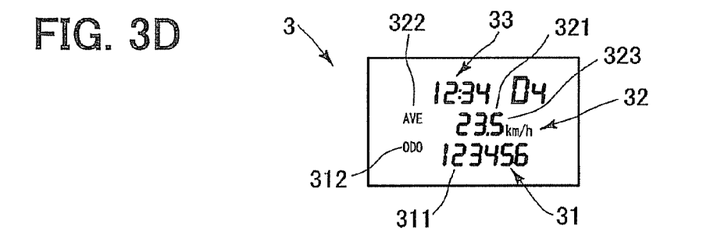
Figure 3E:
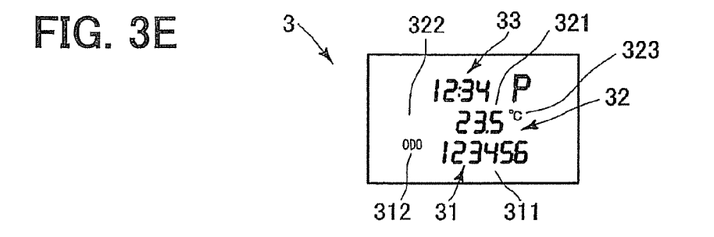

A certain combination of the indication type display region 322 and the unit display region 323 specifies the type of the vehicle information so that the numerical information displayed on the numerical display region 321 represents specific vehicle information. Here, FIGS. 3A to 3E show several display examples of the display 3. As shown in FIGS. 3A to 3E, it is understood which vehicle information the numerical information displayed on the numerical display region 321 corresponds to. As shown in FIG. 3A, when the indication type display region 322 displays the mark "DIST," and the unit display region 323 displays the mark "km," the numerical information displayed on the numerical display region 321 represents the capable driving distance of residual fuel. As shown in FIG. 3B, when the indication type display region 322 displays the mark "AVG," and the unit display region 323 displays the mark "km/l," the numerical information displayed on the numerical display region 321 represents the average fuel consumption. As shown in FIG. 3C, when the indication type display region 322 displays the mark "INST," and the unit display region 323 displays the mark "km/l," the numerical information displayed on the numerical display region 321 represents the instantaneous fuel consumption. As shown in FIG. 3D, when the indication type display region 322 displays the mark "AVG," and the unit display region 323 displays the mark "km/h," the numerical information displayed on the numerical display region 321 represents the average vehicle speed. As shown in FIG. 3E, when the indication type display region 322 does not display any mark, and the unit display region 323 displays the mark "° C.," the numerical information displayed on the numerical display region 321 represents the external temperature.

The first switching display element 31 in FIGS. 3A, 3B, 3D and 3E represents the total driving distance. In this case, the indication type display region 312 represents the mark "ODO." The first switching display element 31 in FIG. 3C represents the sectional driving distance. In this case, the indication type display region 312 represents the mark "TRIP."

The third switching display element 33, which is disposed on the top of the display 3, represents time display element for showing the present time. The third switching display element 33 represents hours and minutes as the present time. The third switching display element 33 includes: a hour display region 331 for displaying "hour" in the present time; and a minute display region 332 for displaying "minute" in the present time. The third switching display element 33 only displays the present time, so that the content in the third switching display element 33 is fixed. Therefore, the third switching display element 33 does not switch the content of the vehicle information, which is different from the first and second switching display elements 31-32. Although not shown in FIG. 2, the display 3 further includes another display element for representing a shift position of the vehicle.

As shown in FIGS. 3A to 3E, the other display element represents marks "R," "N," "L," "D4," and "P."

In FIG. 1, the memory 4 includes a ROM, a RAM, a EEPROM or the like. The memory 4 stores various information such as a program executed by the CPU 2. The memory 4 further stores information about the switching order of the vehicle information, which is switched by the first and second switching display elements 31-32. Specifically, the memory 4 stores the switching order of the various vehicle information from the total driving distance to the sectional driving distance in the first group, which is to be displayed on the first switching display element 31. Here, since the first group merely includes two different types of the vehicle information, the switching order from the total driving distance to the sectional driving distance is substantially equal to the switching order from the sectional driving distance to the total driving distance. Specifically, even when the memory 4 stores the switching order from the total driving distance to the sectional driving distance or the switching order from the sectional driving distance to the total driving distance, the first switching display elements 31 switches alternately the total driving distance to the sectional driving distance.

The memory 4 stores the switching order of the vehicle information in the second group, which is to be displayed on the second switching display element 32. Specifically, the memory 4 stores the switching order from the capable driving distance of residual fuel, the average fuel consumption, the instantaneous fuel consumption, the average vehicle speed, to the external temperature. Alternatively, the switching order may be different. The memory 4 further includes a memory region for storing the current value of the vehicle information, which is in the first and second groups. When required current values of the vehicle information are read out from the memory region, the first and second switching display elements 31, 32 display the required current values of the vehicle information.

The user such as a driver of the vehicle operates the operation device 5. The operation device 5 instructs to switch from the current vehicle information to another vehicle information on the first and second switching display elements 31-32. The operation device 5 is, for example arranged near the display 3, and the operation device 5 is, for example, a button knob having a rod shape, which protrudes toward the driver seat. Alternatively, the operation device 5 may be a push switch, which is disposed on a steering wheel. The user can push the operation device 5 so that the operation device 5 is pushed down. Since the operation device 5 is the momentary switch, when the user pushes down the operation device 5, the operation device 5 is positioned to a push-down position so that the rod of the operation device 5 is retracted to a backside. When the user releases the push-down position of the operation device 5, the operation device 5 automatically returns to an initial protrusion position from the push-down position. While the operation device 5 is being disposed at the push-down position, the operation device 5 continues to output an operation signal, which represents an under operation status.

When the CPU 2 executes the process according to the program stored in the memory 4, the CPU 2 executes a display control process for controlling the display 3. The detail of the display control process will be explained later. Although not shown in FIG. 1, a driving circuit is arranged between the CPU 2 and the display 3. The driving circuit obtains the signal from the CPU 2 so that the driving circuit drives the display 3 according to the signal. Thus, the CPU 2 controls the display 3 via the driving circuit.

Further, the CPU 2 is connected to the communication line 11 for the CAN communication via the CAN communication I/F 6. Thus, the CPU 2 is capable of communicating with one or multiple other computers 10, which are connected to the communication line 11. In the present embodiment, the vehicle information to be displayed such as the total driving distance, the sectional driving distance, the capable driving distance of residual fuel, the average fuel consumption, the instantaneous fuel consumption, the average vehicle speed, the external temperature and the present time is measured by the computers 10. The computer 10 is connected to various sensors for detecting the vehicle information such as the vehicle speed sensor, the residual fuel sensor, the external temperature sensor and the like. The computer measures the current value of the vehicle information according to detected values of various sensors. The CPU 2 obtains the current values of the vehicle information measured by the computer 10, the CPU 2 stores the current values in certain memory regions of the memory 4. The CPU 2 reads out the necessary vehicle information from the memory 4, and controls the display 3 to display the necessary vehicle information. Here, the CPU 2 may measures the current values of the vehicle information.

Figure 4:
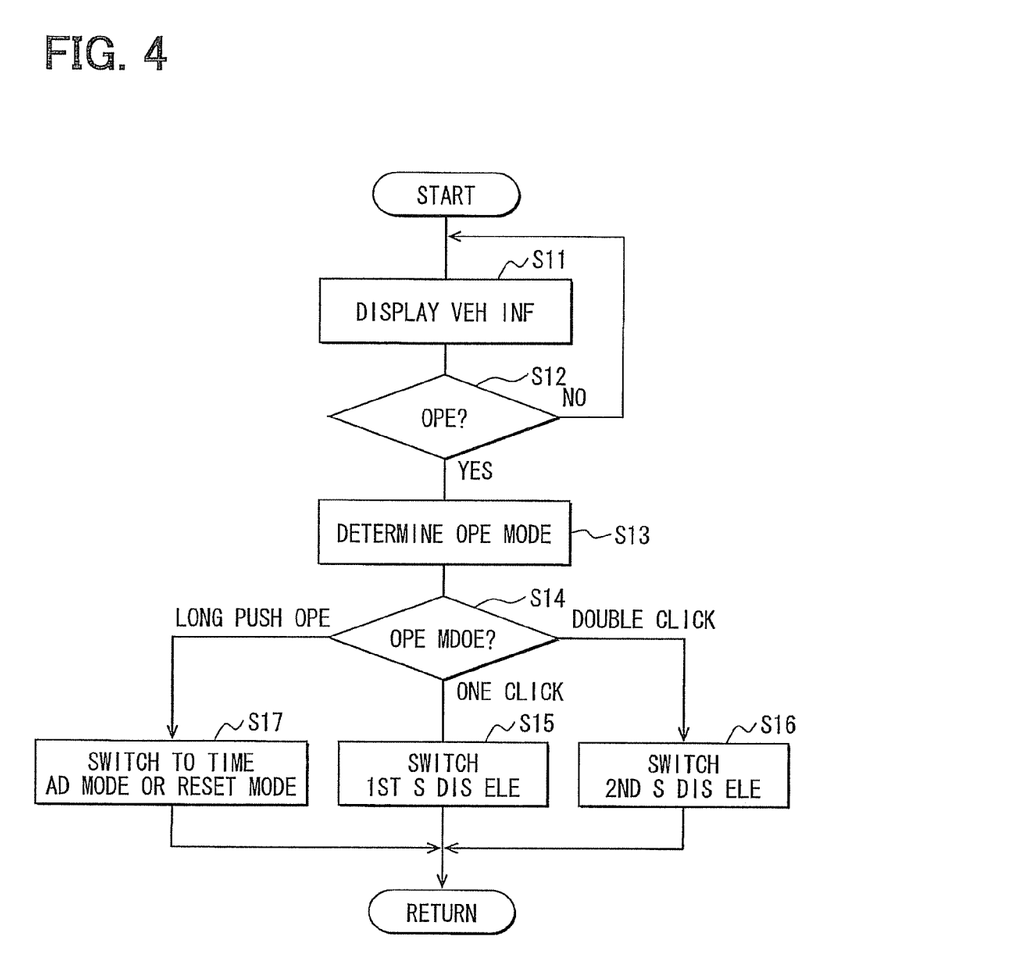
FIG. 4 is a flowchart showing a display control process executed by a CPU.

Next, the display control process executed by the CPU 2 will be explained as follows. FIG. 4 shows a flowchart of the display control process. The CPU 2 starts to execute the process in FIG. 4 when the user starts the engine of the vehicle, for example. The CPU 2 stops executing the process when the user stops the engine of the vehicle. First, the CPU 2 displays the vehicle information on each display element 31-33 in step S11. Specifically, the first switching display element 31 displays one of the total driving distance and the sectional driving distance. The second switching display element 32 displays one of the capable driving distance of residual fuel, the average fuel consumption, the instantaneous fuel consumption, the average vehicle speed and the external temperature. Further, the third switching display element 33 displays the present time. In this case, the vehicle information to be displayed on the first and second switching display elements 31-32 is, for example, information that had been displayed on the first and second switching display elements 31-32 at last when the process in FIG. 4 was previously executed. Alternatively, the vehicle information to be displayed on the first and second switching display elements 31-32 may be initial information. For example, the vehicle information to be displayed on the first and second switching display elements 31-32 may be the first vehicle information stored in the memory 4, so that the vehicle information to be displayed on the first switching display element 31 is the total driving distance in the first group, and the vehicle information to be displayed on the second switching display element 32 is the capable driving distance of residual fuel.

Then, in step S12, the CPU 2 determines according to the operation signal from the operation device 5 whether the user operates the operation device 5. When the user does not operate the operation device 5, i.e., when the determination of step S12 is "NO," it returns to step S11. In this case, the display 3 continues to display the current content in step S11. When the user operates the operation device 5, i.e., when the determination of step S12 is "YES," it goes to step S13.

In step S13, based on the operation signal from the operation device 5, the CPU 2 determines an operation, mode of the user with respect to the operation device 5. Specifically, the CPU 2 determines the operation mode of the operation device 5 whether one click operation, a double click operation, a long time pushing operation or the like. Here, the one click operation means the operation mode such that the user executes a click operation once for a short time, which is shorter than a predetermined time such as 0.8 seconds. The double click operation means the operation mode such that the user continuously executes a click operation twice for a short time, which is shorter than a predetermined time. The long time pushing operation means the operation mode such that the user pushes the operation device 5 for a long time, which is longer than the predetermined time. Then, it goes to step S14. In step S14, the CPU 2 determines the type of the operation mode whether the operation, mode is the one click operation, the double click operation or the long time pushing operation. When the operation mode is the one click operation, it goes to step S15. When the operation mode is the double click operation, it goes to step S16. When the operation mode is the long time pushing operation, it goes to step S17.

Figure 5:
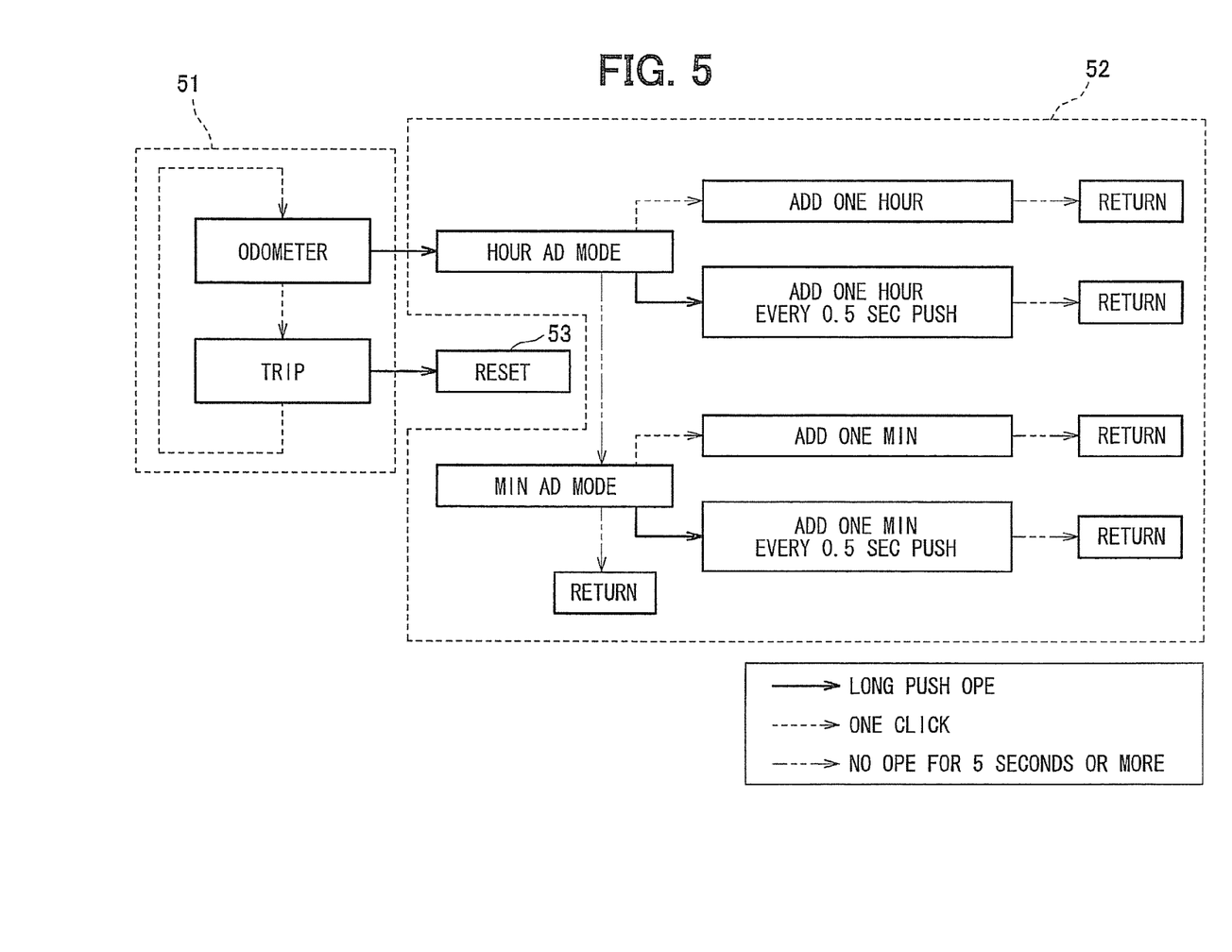
FIG. 5 is a flowchart showing a switching display process of a display screen of a first switching display element when the user operates the operation device.

When it goes to step S15, i.e., when the user executes the one click operation over the operation device 5, the CPU 2 switches from the current value of the vehicle information displayed on the first switching display element 31 to another value of the vehicle information in step S15. Here, FIG. 5 shows a flowchart of the switching manner of the display content on the first switching display element 31 when the user operates the operation device 5. In FIG. 5, a dotted arrow represents the one click operation of the operation device 5. A solid arrow represents the long time pushing operation, and a two-dot chain arrow represents that no operation is performed for five seconds or more. In step S15, the CPU 2 executes a normal mode switching operation, which is shown as 51 in FIG. 5. Specifically, when the user performs the one click operation over the operation device 5, the first switching display element 31 switches between the total driving distance and the sectional driving distance alternately. For example, when the first switching display element 31 displays the total driving distance as shown in FIGS. 3A, 3B, 3D and 3E, the CPU 2 controls the first switching display element 31 to switch from the total driving distance to the sectional driving distance and to display the sectional driving distance in step S15 as shown in FIG. 3C. After step S15, it normally returns to step S11 again. When it goes to steps S11-S14, and step S15 is executed again (i.e., when the user performs the one click operation again), the CPU 2 controls the first switching display element 31 to switch from the sectional driving distance to the total driving distance and to display the total driving distance in step S15. Further, the CPU 2 controls the indication type display region 312 in the first switching display element 31 to switch between the mark "ODO" and the mark "TRIP" according to the vehicle information to be displayed on the first switching display element 31, i.e., the total driving distance or the sectional driving distance. When the CPU 2 executes step S15, i.e., when the CPU 2 switches the display content on the first switching display element 31, the CPU 2 does not execute to switch the display content of the second switching display element 32, i.e., the display content of the second switching display element 32 is maintained.

Figure 6:
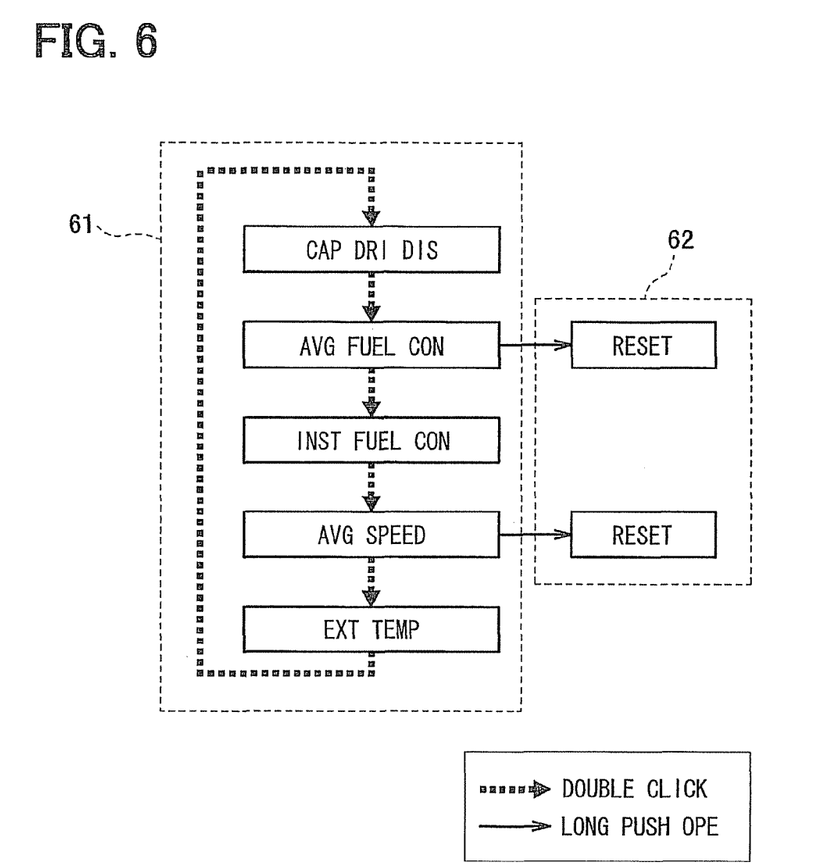
FIG. 6 is a flowchart showing a switching display process of a display screen of a second switching display element when the user operates the operation device.

When it goes to step S14, and performs steps S14 to step S16, i.e., when the user performs the double click operation over the operation device 5, the CPU 2 controls the second switching display element 32 to switch from the current display content (i.e., the current vehicle information) to another display content (i.e., another vehicle information) in step S16. Here, FIG. 6 shows a flowchart of the switching manner of the display content on the second switching display element 32 when the user operates the operation device 5. In FIG. 6, a dotted thick arrow represents the double click operation of the operation device 5. A solid arrow represents the long time pushing operation. In step S16, the CPU 2 executes a normal mode switching operation, which is shown, as 61 in FIG. 6. Specifically, every time the user performs the double click operation over the operation device 5, the CPU 2 controls the second switching display element 32 to switch from the capable driving distance of residual fuel in FIG. 3A, the average fuel consumption in FIG. 3B, the instantaneous fuel consumption in FIG. 3C, the average vehicle speed in FIG. 3D to the external temperature in FIG. 3E in this order. Thus, the CPU 2 executes a normal mode switching operation, which is shown as 61 in FIG. 6. The CPU 2 refers to the switching order stored in the memory 4, which is from the capable driving distance of residual fuel, the average fuel consumption, the instantaneous fuel consumption, the average vehicle speed to the external temperature. Thus, the CPU 2 determines the vehicle information to be switched. Here, when the second switching display element 32 displays the external temperature, and the user performs the double click operation over the operation device 5, the CPU 2 controls the second switching display element 32 to return to the first display content, i.e., the first content of the switching order. Thus, the CPU 2 controls the second switching display element 32 to switch to and display the capable driving distance of residual fuel.

The CPU 2 controls the indication type display region 322 and the unit display region 323 in the second switching display element 32 to switch the display contents thereon according to the vehicle information to be displayed on the second switching display element 32, i.e., the capable driving distance of residual fuel, the average fuel consumption, the instantaneous fuel consumption, the average vehicle speed, or the external temperature, as shown in FIGS. 3A to 3E. Here, when the CPU 2 executes step S16, i.e., when the CPU 2 controls the second switching display element 32 to switch the display content, the CPU 2 does not execute the switching control of the first switching display element 31, i.e., the display content of the first switching display element 31 is maintained. Then, after step S16, it returns to step S11.

When it goes to step S14 to step S17, i.e., when the user performs the long time pushing operation, the CPU 2 controls the display 3 to switch to a time adjustment mode or a reset mode in step S17. In the time adjustment mode, the present time of the third switching display element 33 is adjusted. In the reset mode, the display content of the first or second switching display element 31-32 is reset. Specifically, when the total driving distance is displayed on the first switching display element 31, and the user performs the long time pushing operation, in step S17, the CPU 2 controls the display 3 to switch to the time adjustment mode, which is shown as 52 in FIG. 5. In the time adjustment mode 52, firstly, the CPU 2 controls the display 3 to switch to a hour adjustment mode for adjusting hours displayed on the hour display region 331. In the hour adjustment mode, every time the user performs the one click operation over the operation device 5, one hour is added to the value of the hour display region 331. Further, in the hour adjustment mode, when the user performs the long time pushing operation, one hour is added to the value of the hour display region 331 every time 0.5 second has elapsed during the long time pushing operation. Thus, the hour in the present time can be set to a certain value.

In the hour adjustment mode, when no operation is performed for five seconds or more, the CPU 2 controls the display 3 to switch to a minute adjustment mode for adjusting minutes displayed on the minute display region 332. In the minute adjustment mode, every time the user performs the one click operation over the operation device 5, one minute is added to the value of the minute display region 332. Further, in the minute adjustment mode, when the user performs the long time pushing operation, one minute is added to the value of the minute display region 332 every time 0.5 second has elapsed during the long time pushing operation. Thus, the minute in the present time can be set to a certain value. In the minute adjustment mode, when no operation is performed for five seconds or more, the CPU 2 controls the display 3 to switch from the minute adjustment mode to the normal mode 51.

When the first switching display element 31 displays the sectional driving distance, or when the second switching display element 32 displays the average fuel consumption or the average vehicle speed, and further, the user performs the long time pushing operation, in step S17 in FIG. 4, the CPU 2 controls the display 3 to switch to a reset mode. In reset mode, the sectional driving distance, the average fuel consumption or the average vehicle speed is reset to zero. In the reset mode 53 for resetting the sectional driving distance in FIG. 5, the CPU 2 controls the computer 10 to reset the sectional driving distance to be zero. Further, the CPU 2 controls the first switching display element 31 to reset the sectional driving distance to be zero and to display the sectional driving distance as zero. After the sectional driving distance is reset, the CPU 2 controls the display 3 to switch from the reset mode 53 to the normal mode 51. In the reset mode 62 for resetting the average fuel consumption or the average vehicle speed in FIG. 6, the CPU 2 controls the computer 10 to reset the average fuel consumption or the average vehicle speed to be zero. Further, the CPU 2 controls the second switching display element 32 to reset the average fuel consumption or the average vehicle speed to be zero and to display the average fuel consumption or the average vehicle speed as zero. After the average fuel consumption or the average vehicle speed is reset, the CPU 2 controls the display 3 to switch from the reset mode 62 to the normal mode 61.

Here, when the first switching display element 31 displays re-settable display content, and further, the second switching display element 32 displays re-settable display content, i.e., when the first switching display element 31 displays the sectional driving distance, and the second switching display element 32 displays the average fuel consumption or the average vehicle speed, and further, the user performs the long time pushing operation, in step S17, the CPU 2 executes a process for selecting and resetting one of the first switching display element 31 and the second switching display element 32. Specifically, firstly, the CPU 2 controls the first switching display element 31 to blink the sectional driving distance for three seconds, for example. While blinking the sectional driving distance, when the user performs the long time pushing operation on the operation device 5 for one second or more, the CPU 2 resets the value of the sectional driving distance. After blinking the sectional driving distance, or while blinking the sectional driving distance, when the user performs the one click operation on the operation device 5, the CPU 2 controls the second switching display element 32 to blink the display content (i.e., the average fuel consumption or the average vehicle speed) thereon for three seconds, for example. While blinking the average fuel consumption or the average vehicle speed, when the user performs the long time pushing operation on the operation device 5 for one second or more, the CPU 2 resets the value of the average fuel consumption or the average vehicle speed. When the user performs the double click operation on the operation device 5 in the reset mode, the CPU 2 switches from the reset mode without resetting. After step S17, it returns to step S11.

Thus, in the present embodiment, since the display 3 includes two switching display elements 31-32, of which the display contents are switchable according to the operation of the operation device 5, the user checks two different items of the vehicle information at the same time. Further, since the operation mode in case of operating the operation device 5 includes the one click operation and the double click operation, which are distinguishable, the switching operation of the switching display elements 31-32 can be independently performed. Thus, the switching display elements 31-32 can display the vehicle information, which is required by the user, at the same time. Further, when the user performs the long time pushing operation on the operation device 5, the present time of the third switching display element 33 can be adjusted, and the value of the vehicle information can be reset.

In the present embodiment, the display 3 includes two switching display elements. Alternatively, the display 3 may include three or more switching display elements. In this case, many items of the vehicle information can be displayed at the same time. Further, since the items of the vehicle information, which are switchable and displayed in one switching display element, is reduced, the required vehicle information can be displayed with operation of the operation device having the small number of operation times. For example, when the display includes three switching display elements, and the user performs triple click operation of the operation device, the display content of the third switching display element is switched. Here, the triple click operation is an operation mode that the user performs a short time pushing operation three times continuously.

In the present embodiment, the CPU 2 determines according to the operation mode of the operation device 5, i.e., the one click operation or the double click operation, which display content on the first or second switching display element is switched and displayed. Alternatively, the operation device 5 can preliminary set and select one of the first and second switching display elements, of which the display content is to be switched and displayed. Specifically, for example, every time the user performs the double click operation on the operation device 5, the CPU 2 selects and sets one of the first and second switching display elements as the switching display element to be switched and displayed. While the first switching display element is selected, and when the user performs the one click operation on the operation device 5, the CPU 2 switches and displays the display content of the first switching display element only. While the second switching display element is selected, and when the user performs the one click operation on the operation device 5, the CPU 2 switches and displays the display content of the second switching display element only. Thus, the switching operations of the display contents of the first and second switching display elements are individually performed.

In the present embodiment, the vehicle information displayed on the first and second switching display elements 31, 32 corresponds to an item. The CPU 2 for executing step S13 in FIG. 4 corresponds to a determination element. The CPU 2 for executing steps S15-S17 in FIG. 4 corresponds to a display control element. The CPU 2 for executing step S15 in FIG. 4 corresponds to a first display control element. The CPU 2 for executing step S16 in FIG. 4 corresponds to a second display control element. One of the one click operation and the double click operation on the operation device 5 corresponds to a first operation mode, and the other of the one click operation and the double click operation on the operation device 5 corresponds to a second operation mode. The sectional driving distance, the average fuel consumption and the average vehicle speed correspond to a re-settable item. The long time pushing operation of the operation device 5 corresponds to a third operation mode.

The above disclosure has the following aspects.

According to an aspect of the present disclosure, an in-vehicle display apparatus includes: a plurality of switchable display elements, each of which displays one of display items in a corresponding display group that is assigned to the switchable display element, wherein each display group includes a plurality of predetermined display items; an operation device for outputting an operation signal according to an operation of a user; a determination device for determining an operation mode of the operation of the user with respect to the operation device, according to the operation signal; and a display control device for independently controlling each switchable display element to execute a switching and displaying operation according to the operation mode of the operation device. In the switching and displaying operation, the display control device controls one of switchable display elements to switch a current display item to another display item and to display the another display item according to a predetermined switching order of display items every time the operation device outputs the operation signal.

In the above apparatus, since the apparatus includes multiple switchable display elements for switching a display item displayed on the switchable display element, multiple display items are displayed at the same time. Further, the number of display items to be displayed on each switchable display element is reduced, compared with a case where the apparatus includes only one switchable display element. Thus, the apparatus can switch and display required display item effectively and quickly. Further, since the apparatus includes only one operation device for switching the display items of the switchable display elements, a manufacturing cost of the apparatus is reduced. Furthermore, the determination device determines the operation mode of the user with respect to the operation device, and the display control device controls independently and individually the switchable display elements according to the operation mode. Thus, the switchable display elements can display required display items at the same time. Thus, the apparatus displays multiple display items at the same time when the user operates only one operation device. Therefore, the apparatus can easily display the required display items, which is required by the user, by merely selecting the operation mode of the operation device.

Alternatively, the determination device may determine the operation mode according to the number of operation times or operation duration time, which is defined by the operation signal. In this case, the apparatus can easily display the required display items by merely selecting the number of operation times or operation duration time. Thus, the apparatus can easily switch from the current display item to the required display item. Specifically, in a prior art, since the user has to find a certain operation device among multiple operation devices that performs required operation, the user spend much time to move an eye sight line. However, in the present case, since the user merely operates only one operation device, the movement of the eye sight line for finding the operation device is minimized. After the user find the operation device, the user can operate the operation device without watching the operation device. Thus, even when the user is a driver of the vehicle, and the driver drives the vehicle, the user can switch the display element to the required display item easily and safely. Therefore, the apparatus has high HMI function.

Alternatively, the plurality of switchable display elements may include a first switchable display element and a second switchable display element. A first display group is assigned to the first switchable display element, and a second display group is assigned to the second switchable display element. The first display group includes a plurality of predetermined first display items, and the second display group includes a plurality of predetermined second display items. Each of the second display items is different from the first display items. The operation mode includes a predetermined first operation mode and a predetermined second operation mode, which is different from the first operation mode. The determination device determines whether the operation device is operated in the first operation mode or the second operation mode. The display control device includes a first display control device and a second display control device. The first display control device controls the first switchable display element to switch the current display item to the another display item, which are included in the first display group, according to a predetermined first switching order every time the determination device determines that the operation device is operated in the first operation mode. The second display control device controls the second switchable display element to switch the current display item to the another display item, which are included in the second display group, according to a predetermined second switching order every time the determination device determines that the operation device is operated in the second operation mode. In this case, since the apparatus includes two switchable display elements, the apparatus can display two display items at the same time. When the user operates the operation device in the first operation mode, the user can switch the content of the display item on the first switchable display element. When the user operates the operation device in the second operation mode, the user can switch the content of the display item on the second switchable display element. Thus, the first and second switchable display elements can display required display items independently at the same time.

Alternatively, the operation device may be a pushing type operation device so that the user pushes the operation device. The first operation mode is defined by the operation of the user when the user pushes the operation device once for operation duration time, which is shorter than predetermined time, and the second operation mode is defined by the operation of the user when the user pushes, the operation device twice successively for the operation duration time, which is shorter than the predetermined time. In this case, the operation device is the pushing type operation device, and the first operation mode is defined by one short pushing operation, and the second operation mode is defined by two short pushing operation. Thus, the user can distinguish the first operation mode and the second operation mode. Thus, one of the first and second switchable display elements, which is not selected or required by the user, is not switched. Further, since the first and second operation modes relate to the same pushing down operation, the operation load of the user is reduced.

Alternatively, the first display items or the second display items may include a re-settable display item. A content of the re-settable display item is re-settable. The operation mode further includes a predetermined third operation mode, which is different from the first operation mode and the second operation mode. The determination device further determines whether the operation device is operated in the first operation, mode, the second operation mode, or the third operation mode. When the first switchable display element or the second switchable display element displays the re-settable display item, and the determination device determines that the operation device is operated in the third operation mode, the display control device controls the first switchable display element or the second switchable display element to reset the content of the re-settable display item. In this case, when the first or second switchable display element displays the re-settable display item, and the user operates the operation device in the third operation mode, the content of the re-settable display item is reset. Thus, the user can control the apparatus to switch the display item on the first switchable display element, to switch the display item on the second switchable display element, and to reset the re-settable display item according to one operation of the operation device.

Alternatively, the in-vehicle display apparatus may further include: a time display element for displaying the present time. The operation mode further includes a predetermined third operation mode, which is different from the first operation mode and the second operation mode. The determination device further determines whether the operation device is operated in the first operation mode, the second operation mode, or the third operation mode. When the determination device determines that the operation device is operated in the third operation mode, the display control device controls the time display element to switch to a time adjustment mode for adjusting the present time. In the time adjustment mode, the display control device controls the time display element to display the present time according to the operation of the user. In this case, since the apparatus includes the time display element, the user can recognize the present time. Further, the user can operate the operation device in the third operation mode. In the time adjustment mode, the user can adjust the present time by operating the operation device. Thus, the user can adjust the present time correctly.

Alternatively, the third operation mode may be defined by the operation of the user when the user pushes the operation device for operation duration time, which is longer than the predetermined time. Thus, the third operation mode can be distinguishable from the first and second operation modes.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An in-vehicle display apparatus comprising:
   a first switchable display element for displaying a display item from a first display group that is assigned to the first switchable display element, wherein the first display group includes a plurality of predetermined display items;
   a second switchable display element for displaying a display item from a second display group that is assigned to the second switchable display element, wherein the second display group includes a plurality of predetermined display items;
   an operation device for outputting an operation signal according to an operation of a user;
   a determination device for determining whether the operation device is operated in a predetermined first operation mode or a predetermined second operation mode, which is different from the predetermined first operation mode, according to the operation signal; and
   a display control device,
   wherein the display control device controls the first switchable display element to switch a current display item to another display item, which are included in the first display group, according to a predetermined first switching order and controls the second switchable display element not to switch a current display item to another display item, which are included in the second display group every time the determination device determines that the operation device is operated in the first operation mode; and
   wherein the display control device controls the second switchable display element to switch the current display item to the another display item, which are included in the second display group, according to a predetermined second switching order and controls the first switchable display element not to switch the current display item to the another display item, which are included in the first display group every time the determination device determines that the operation device is operated in the second operation mode.

2. The in-vehicle display apparatus according to claim 1, wherein the determination device determines the operation mode according to the number of operation times or operation duration time, which is defined by the operation signal.

3. The in-vehicle display apparatus according to claim 1, wherein the operation device is a pushing type operation device so that the user pushes the operation device,
   wherein the first operation mode is defined by the operation of the user when the user pushes the operation device once for operation duration time, which is shorter than predetermined time, and
   wherein the second operation mode is defined by the operation of the user when the user pushes the operation device twice successively for the operation duration time, which is shorter than the predetermined time.

4. The in-vehicle display apparatus according to claim 3,
   wherein the first display items or the second display items includes a re-settable display item,
   wherein a content of the re-settable display item is re-settable,
   wherein the operation mode further includes a predetermined third operation mode, which is different from the first operation mode and the second operation mode,
   wherein the determination device further determines whether the operation device is operated in the first operation mode, the second operation mode, or the third operation mode, and
   wherein when the first switchable display element or the second switchable display element displays the re-settable display item, and the determination device determines that the operation device is operated in the third operation mode, the display control device controls the first switchable display element or the second switchable display element to reset the content of the re-settable display item.

5. The in-vehicle display apparatus according to claim 4,
   wherein the third operation mode is defined by the operation of the user when the user pushes the operation device for operation duration time, which is longer than the predetermined time.

6. The in-vehicle display apparatus according to claim 3, further comprising:
   a time display element for displaying a present time,
   wherein the operation mode further includes a predetermined third operation mode, which is different from the first operation mode and the second operation mode,
   wherein the determination device further determines whether the operation device is operated in the first operation mode, the second operation mode, or the third operation mode,
   wherein, when the determination device determines that the operation device is operated in the third operation mode, the display control device controls the time display element to switch to a time adjustment mode for adjusting the present time, and wherein, in the time adjustment mode, the display control device controls the time display element to display the present time according to the operation of the user.

7. The in-vehicle display apparatus according to claim 6, wherein the first and second switchable display elements and the time display element are always simultaneously displayed on the in-vehicle display apparatus.

8. The in-vehicle display apparatus according to claim 1, wherein the first and second switchable display elements are always simultaneously displayed on the in-vehicle display apparatus.

9. An in-vehicle display apparatus comprising:
- a first switchable display element for displaying a display item from a first display group that is assigned to the first switchable display element, wherein the first display group includes a plurality of predetermined display items;
- a second switchable display element for displaying a display item from a second display group that is assigned to the second switchable display element, wherein the second display group includes a plurality of predetermined display items;
- an operation device for outputting an operation signal according to a push-down operation of a user;
- a determination device for determining whether the operation device is operated a predetermined number of operation times according to the operation signal;
- a display control device for independently controlling each switchable display element to execute a switching and displaying operation according to the predetermined number of operation times determined by the determination device,
- wherein the display control device controls the first switchable display element to switch a current display item to another display item, which are included in the first display group, according to a predetermined first switching order and controls the second switchable display element not to switch a current display item to another display item, which are included in the second display group every time the determination device determines that the operation device is operated another predetermined number of operation times, which is different from the predetermined number of operation times; and
- wherein the display control device controls the second switchable display element to switch the current display item to the another display item, which are included in the second display group, according to a predetermined second switching order and controls the first switchable display element not to switch the current display item to the another display item, which are included in the first display group every time the determination device determines that the operation device is operated the predetermined number of operation times.

10. The in-vehicle display apparatus according to claim 9, wherein the another predetermined number of operation times is defined as once such that the operation device is pushed down once for an operation duration time shorter than predetermined time, and wherein the predetermined number of operation times is defined as twice such that the operation device is pushed down twice for the operation duration time shorter than the predetermined time.

11. The in-vehicle display apparatus according to claim 10, wherein the plurality of predetermined display items in the first display group provide a total driving distance and a sectional driving distance, and wherein the plurality of predetermined display items in the second display group provide a driving distance of residual fuel, an average fuel consumption, an instantaneous fuel consumption, an average speed and an external temperature.

* * * * *